US009910170B1

(12) United States Patent
Billiard et al.

(10) Patent No.: US 9,910,170 B1
(45) Date of Patent: Mar. 6, 2018

(54) NEUTRON EMISSION DETECTOR

(71) Applicant: HONEYWELL FEDERAL MANUFACTURING & TECHNOLOGIES, LLC, Kansas City, MO (US)

(72) Inventors: Gregory Billiard, Lenexa, KS (US); George Bohnert, Harrisonville, MO (US); Christopher Boese, Pleasant Hill, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 15/182,731

(22) Filed: Jun. 15, 2016

(51) Int. Cl.
*G01T 3/02* (2006.01)

(52) U.S. Cl.
CPC ....................... *G01T 3/02* (2013.01)

(58) Field of Classification Search
CPC .......................................................... G01T 3/02
See application file for complete search history.

(56) References Cited

U.S. PATENT DOCUMENTS

| | | | |
|---|---|---|---|
| 2,604,598 A | 7/1952 | Mead et al. | |
| 5,278,417 A * | 1/1994 | Sun | G01T 3/00 250/390.03 |
| 7,633,062 B2 | 12/2009 | Morris et al. | |
| 7,635,849 B2 | 12/2009 | Klein et al. | |
| 8,445,860 B2 | 5/2013 | Lustig | |
| 8,975,593 B1 * | 3/2015 | Best | G01T 3/008 250/391 |
| 2004/0164250 A1 * | 8/2004 | Cork | G01T 1/244 250/390.06 |
| 2011/0006195 A1 * | 1/2011 | Prendergast | G01T 1/2907 250/252.1 |
| 2012/0043632 A1 * | 2/2012 | Nikolic | H01L 31/115 257/429 |
| 2013/0228696 A1 * | 9/2013 | McGregor | G01T 3/00 250/382 |

* cited by examiner

*Primary Examiner* — David Porta
*Assistant Examiner* — Hugh H Maupin
(74) *Attorney, Agent, or Firm* — Hovey Williams LLP

(57) ABSTRACT

A device for detecting neutron emission comprises a housing, a moderator structure, a neutron detection element, and a plurality of plate electrodes. The housing provides an enclosure and shielding from radiation other than neutron emission. The moderator structure is positioned within the housing and is formed from energy absorbing material. The moderator structure includes a first side wall and a second side wall spaced apart and oriented parallel to one another. The neutron detection element includes a neutron reactive material deposited on a planar substrate. The plate electrodes are formed from electrically conductive material and spaced apart from one another. Each adjacent pair of plate electrodes has a voltage therebetween, wherein one neutron detection element is positioned between adjacent pairs of plate electrodes and the combination of plate electrodes and neutron detection elements is positioned between the first side wall and the second side wall of the moderator structure.

24 Claims, 6 Drawing Sheets

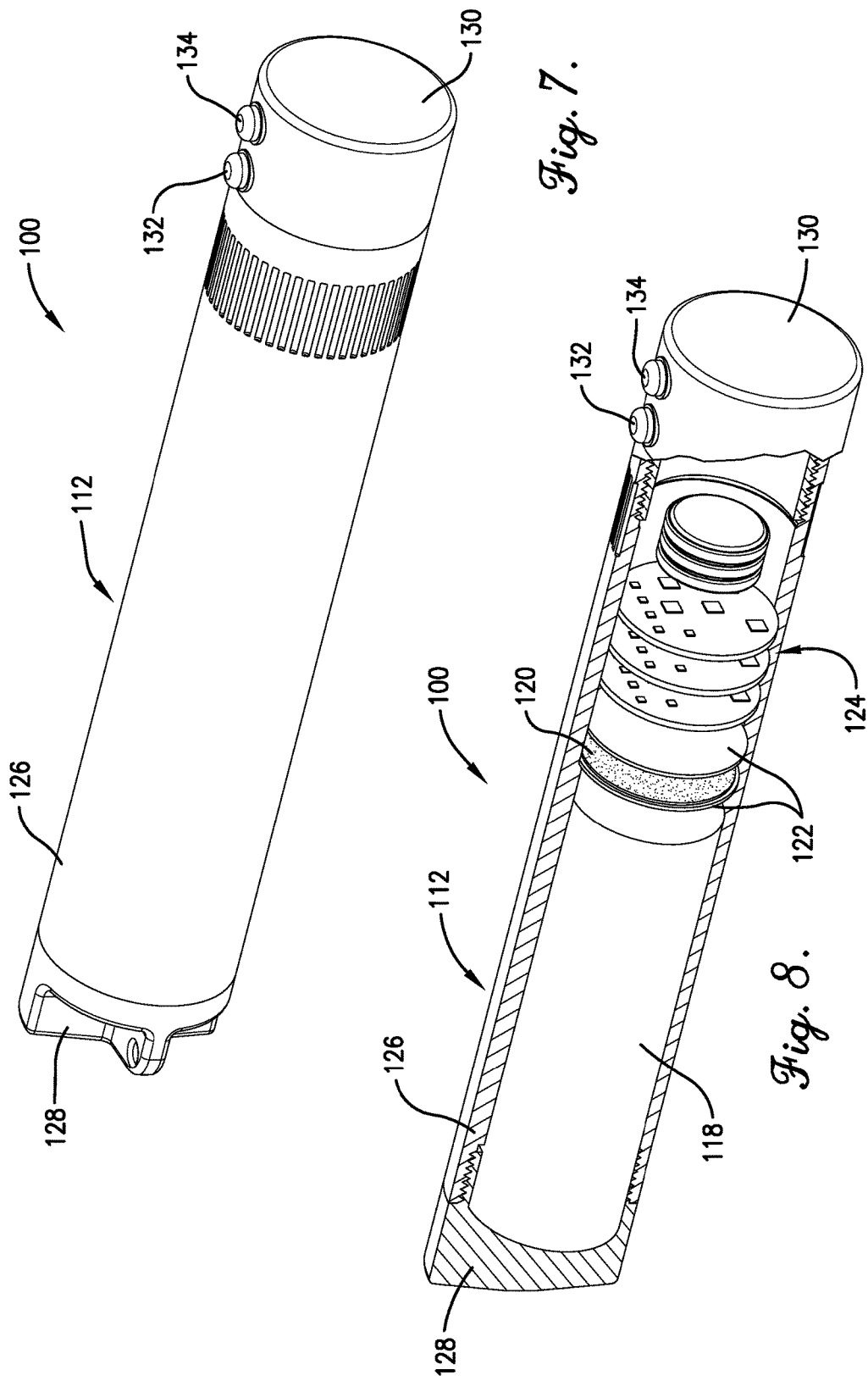

NEUTRON EMISSION DETECTOR

BACKGROUND OF THE INVENTION

Field of the Invention

Embodiments of the current invention relate to devices and systems that provide neutron emission detection.

Description of the Related Art

Neutron emission is a type of radioactive decay, occurring when one or more neutrons are ejected from atoms, often resulting from atomic forces trying to stabilize the nucleus of the atom. High-energy neutrons may damage and degrade materials over time leading to the decay of building structures. More importantly, exposure of humans and animals to neutron emission can result in tissue damage and lead to the development of cancers. Furthermore, dirty bombs or weapons of mass destruction may spontaneously emit neutrons Thus, the detection of neutron emission is a critical concern.

SUMMARY OF THE INVENTION

Embodiments of the current invention provide a distinct advance in the art of neutron emission detection. More particularly, embodiments of the invention provide devices and systems for detecting neutron emission that are small and portable and may detect neutron emission from more than one source.

An embodiment of the device may comprise a housing, a moderator structure, a neutron detection element, and a plurality of plate electrodes. The housing may provide an enclosure and shielding from radiation other than neutron emission. The moderator structure may be positioned within the housing and formed from energy absorbing material. The moderator structure may include a first side wall and a second side wall spaced apart and oriented roughly parallel to one another. The neutron detection element may include a neutron reactive material deposited on a roughly planar substrate. The plate electrodes may be formed from electrically conductive material and spaced apart from one another, each adjacent pair of plate electrodes having a voltage therebetween. Typically, one neutron detection element is positioned between adjacent pairs of plate electrodes, and the combination of plate electrodes and neutron detection elements is positioned between the first side wall and the second side wall of the moderator structure.

Another embodiment of the device may comprise a housing, a moderator structure, a neutron detection element, and a plurality of plate electrodes. The housing may provide an enclosure and shielding from radiation other than neutron emission. The housing may have a cylindrical shape and include a circumferential side wall with a first end wall and a spaced-apart second end wall coupled to opposing ends of the side wall. The moderator structure may be formed from energy absorbing material and may have a solid, cylindrical shape. The moderator structure may be positioned within the housing with one end thereof abutting the first end wall. The neutron detection element may include a neutron reactive material deposited on a roughly planar substrate. The plate electrodes may be formed from electrically conductive material and spaced apart from one another. Each adjacent pair of plate electrodes may have a voltage therebetween. One neutron detection element may be positioned between adjacent pairs of plate electrodes. The combination of plate electrodes and neutron detection elements may be positioned adjacent an opposing end of the moderator structure.

An embodiment of the system may comprise a system housing and a plurality of neutron detecting devices. The system housing may provide an enclosure and shielding from radiation other than neutron emission and may include a plurality of side walls. Each neutron detecting device may include a device housing, a moderator structure, a neutron detection element, and a plurality of plate electrodes. The device housing may have a cylindrical shape and include a circumferential side wall with a first end wall and a spaced-apart second end wall coupled to opposing ends of the side wall. The moderator structure may be formed from energy absorbing material and may have a solid, cylindrical shape. The moderator structure may be positioned within the device housing with one end thereof abutting the first end wall. The neutron detection element may include a neutron reactive material deposited on a roughly planar substrate. The plate electrodes may be formed from electrically conductive material and spaced apart from one another. Each adjacent pair of plate electrodes may have a voltage therebetween. One neutron detection element may be positioned between adjacent pairs of plate electrodes. The combination of plate electrodes and neutron detection elements may be positioned adjacent an opposing end of the moderator structure. Each neutron detecting device may be coupled to a side wall of the system housing and oriented in a unique direction.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 7 is a perspective view of a second embodiment of the device including a cylindrical housing and first and second indicators;

FIG. 8 is a perspective view of the device of FIG. 7 with a portion of the housing cut away to reveal a moderator structure, a neutron detection element, and a plurality of plate electrodes positioned in the interior of the device;

Figure 1:
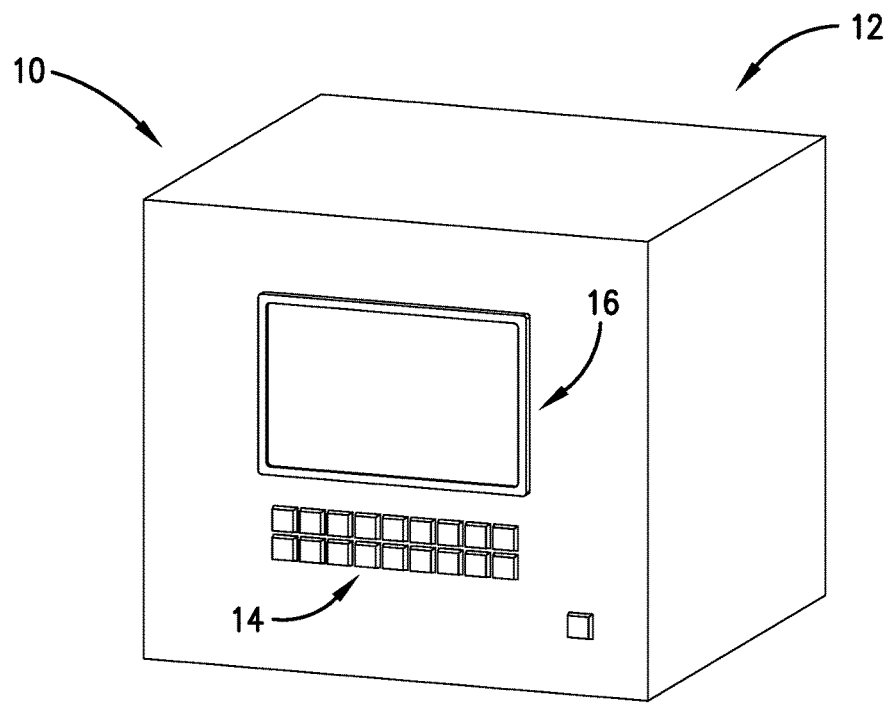
FIG. 1 is a front perspective view of a device, constructed in accordance with a first embodiment of the current invention, for detecting an emission of neutrons, the device including a housing, a display, and a user interface.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
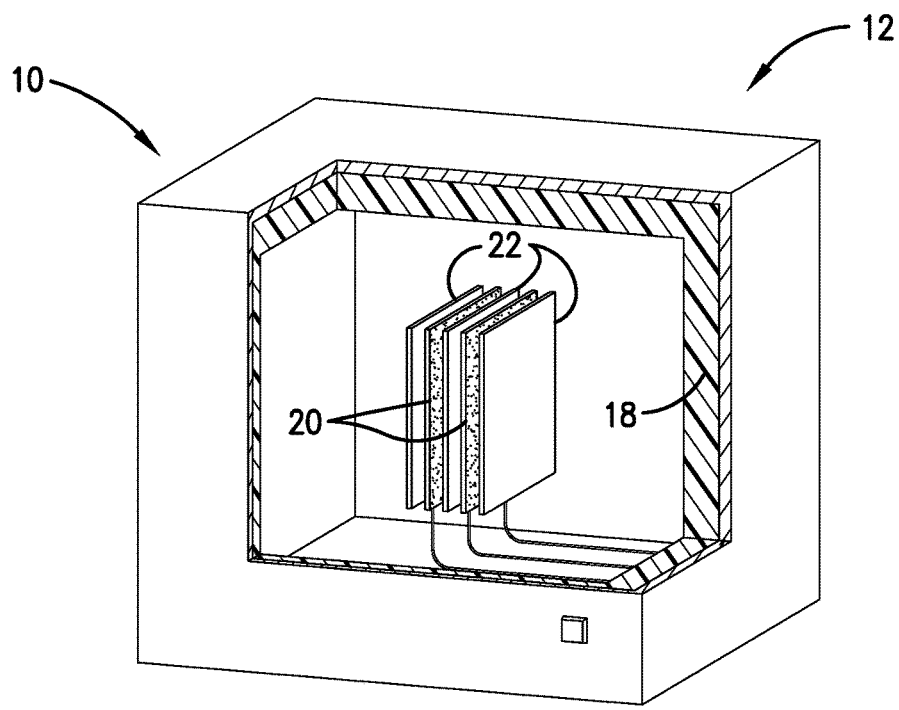
FIG. 2 is a front perspective view of the device of FIG. 1 with a portion of housing and a moderator structure cut away to reveal a neutron detection element and a plurality of plate electrodes positioned in the interior of the device.

A device 10, constructed in accordance with various embodiments of the current invention, for detecting an emission of neutrons is shown in FIGS. 1 and 2. The device 10 may broadly comprise a housing 12, a user interface 14, a display 16, a moderator structure 18, a neutron detection element 20, a plurality of plate electrodes 22, and a processing element 24. The device 10 may further comprise a communication element, such as wireless radio frequency (RF) communication components utilizing RF standards such as cellular 2G, 3G, or 4G, Institute of Electrical and Electronics Engineers (IEEE) 802.11 standard such as WiFi, IEEE 802.16 standard such as WiMAX, Bluetooth™, or combinations thereof, which allows the device 10 to communicate with other devices or systems to transmit data regarding the detection of neutron emission.

The housing 12 generally provides an enclosure and radiation shielding for the moderator structure 18, the neutron detection element 20, the plate electrodes 22, and the processing element 24. In various embodiments, the housing 12 may have a six-sided shape, either cubic or rectangular box, with a top wall, a bottom wall, and four side walls. Alternatively, the housing 12 may have a spherical or other shape. The housing 12 may be constructed from solid, hardened, emissive material such as anodized aluminum, specifically black anodized aluminum, or other metals with similar properties. The housing 12 may include vents or other air flow openings to allow atmospheric gases to flow into and out of the housing 12.

The user interface 14 generally allows the user to utilize inputs and outputs to interact with the device 10. Inputs may include buttons, pushbuttons, knobs, jog dials, shuttle dials, directional pads, multidirectional buttons, switches, keypads, keyboards, mice, joysticks, microphones, or the like, or combinations thereof. Outputs may include audio speakers, lights, light-emitting diodes (LEDs), dials, meters, or the like, or combinations thereof. With the user interface 14, the user may be able to control the features and operation of the device 10. For example, the user may be able to initiate or enable the detection of neutrons, control the information shown on the display 16, adjust the performance of the device 10, such as controlling the sensitivity of the neutron detection by adjusting a value of a threshold which indicates a potentially harmful level of neutron flux, and so forth.

The display 16 may include video devices of the following types: plasma, LED, organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. The display 16 may include a screen on which the information is presented, with the screen possessing a square or a rectangular aspect ratio that may be viewed in either a landscape or a portrait mode. In various embodiments, the display 16 may also include a touch screen occupying the entire screen or a portion thereof so that the display 16 functions as part of the user interface 14. The touch screen may allow the user to interact with the device 10 by physically touching, swiping, or gesturing on areas of the screen. The display 16 may be mounted on, or embedded in, one of the side walls of the housing 12.

Figure 3:
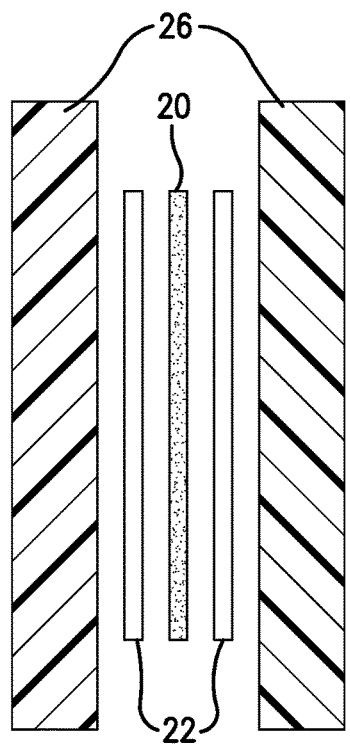
FIG. 3 is a side view of an alternative embodiment of the moderator structure, the neutron detection element, and the plate electrodes.

The moderator structure 18 generally provides energy absorption of high-velocity neutrons to slow them down and may include at least first and second side walls 26 that are spaced apart and oriented roughly parallel to one another, as shown in FIG. 3. In some embodiments, the moderator structure 18 may include third and fourth side walls, a top wall, and a bottom wall, as shown in FIG. 2. In such embodiments, the moderator structure 18 may have the same shape as the interior of the housing 12 and may be positioned therein with the outer surfaces of the moderator structure 18 facing the inner surfaces of the housing 12. In other embodiments, the moderator structure 18 may have a spherical shape. The moderator structure 18 may be constructed from materials, such as (high-density) polyethylene, graphite, boron-filled materials, water-based gels, non-Newtonian fluids, and the like, that provide at least some energy absorption to reduce the velocity of high-velocity neutrons. The thickness of the walls of the moderator structure 18 may be determined by factors such as the anticipated energy of the neutrons to be detected, the energy absorbing properties of the material used, and so forth. An exemplary moderator structure 18 may be formed from polyethylene and have all walls (side walls, top wall, bottom wall) possess a thickness (from exterior to interior) of approximately 4 inches.

High-velocity neutrons may have an energy level of up to 2 mega electron Volts (MeV) and a velocity of up to $2 \times 10^7$ meters per second (mps). The moderator structure 18 may reduce the energy to approximately 0.025 eV and the velocity to approximately $2.2 \times 10^3$ mps in order for the neutrons to interact with the neutron detection element 20 as described below.

The neutron detection element 20 generally emits a response in the presence of neutron emission and may include a substrate that is coated with a neutron responsive material. In embodiments of the device 10 with more than two plate electrodes 22, there may be a plurality of coated substrates. The substrate may be embodied by a roughly planar wafer, either circular or square, with first and second surfaces generally parallel to one another and whose thickness is much less than its surface area. The substrate may be formed from materials such as piezoelectrics, silicon, glass, quartz, and the like. The coating may include materials, such as the boron isotope $^{10}B$, that respond or react to the presence of neutron emission. The coating may be spin-coat applied to both surfaces of the substrate. The neutron detection element 20 may emit particles, such as 1.4 MeV alpha particles, when neutrons strike the responsive coating. In addition, the substrate may have openings extending between the first and second surfaces, such as perforations or pores, and may lack the neutron responsive coating in the openings. The openings may create spaces in the neutron detection element 1A through which ionized gas or free electrons may flow.

The plate electrodes 22 generally provide an electronic signal in response to the particle output from the neutron detection element 20. Each plate electrode 22 may have a round, square, or rectangular profile with a thickness much less than its surface area and may be formed from electrically conductive materials such as metals, including copper, nickel, iron, lead, tin, gold, silver, titanium, aluminum, alloys thereof, or the like. The device 10 may include at least two plate electrodes 22, such as shown in FIG. 3, wherein each plate electrode 22 is electrically connected to a voltage source (not shown in the figures), such that when the device 10 is operating, there is a voltage (or potential difference) between the plate electrodes 22. For example, a first plate electrode 22 may have a voltage of 0 Volts (V), or electrical ground potential, and a second plate electrode 22 may have a voltage of 5 V. Thus, the voltage of the plate electrodes 22 is 5 V. Other embodiments of the device 10, such as shown in FIG. 2, may include more than two plate electrodes 22—in this case, three plate electrodes 22. In such embodiments, each two adjacent plate electrodes 22 may have a voltage between them. One way to implement such a configuration is to electrically connect all of the odd-numbered plate electrodes 22 (such as 1, 3, etc.) to a first voltage and all of the even-numbered plate electrodes 22 (such as 2, 4, etc.) to a second voltage. As an example, the first voltage may be 0 V and the second voltage may be 5 V, or vice-versa.

When the neutron detection element 20 outputs particles in response to the emission of neutrons, an electric current flows between at least two of the plate electrodes 22, as described in more detail below. An electric current may also flow from the plate electrodes 22 to the voltage source (voltage supply, processing element 24, etc.) and vice-versa. This electric current may be an electrical output signal from the plate electrodes 22. The level of electrical output signal from the plate electrodes 22 may be proportional to the amount of neutron flux. The electrical output signal may also be embodied by a voltage, a resistance, a capacitance, an inductance, or other electrical characteristics. In some embodiments, the electric current may be directly input into an amplifier, such as a current to voltage amplifier. In other embodiments, the electric current may be sensed, such as with inductive sensing or the like.

Figure 4:
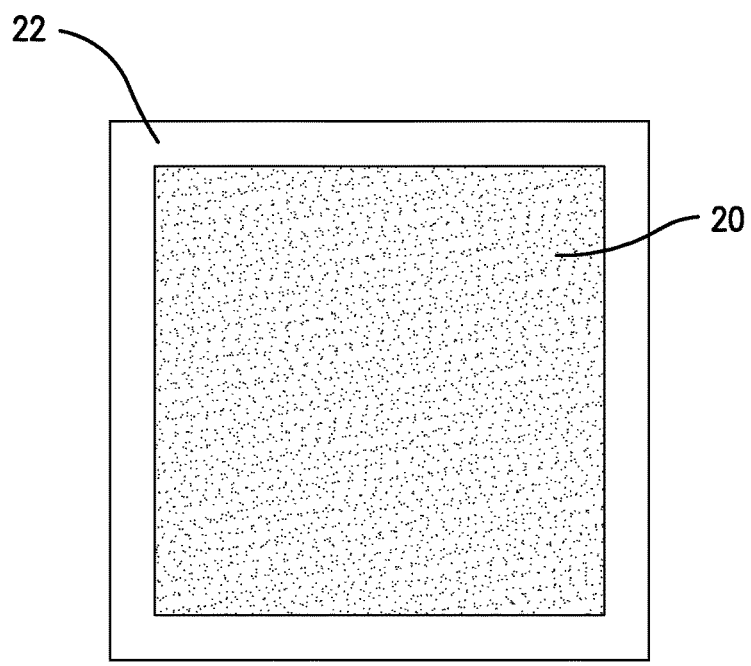
FIG. 4 is a front view of another alternative embodiment of the neutron detection element and one of the plate electrodes.
Figure 5:
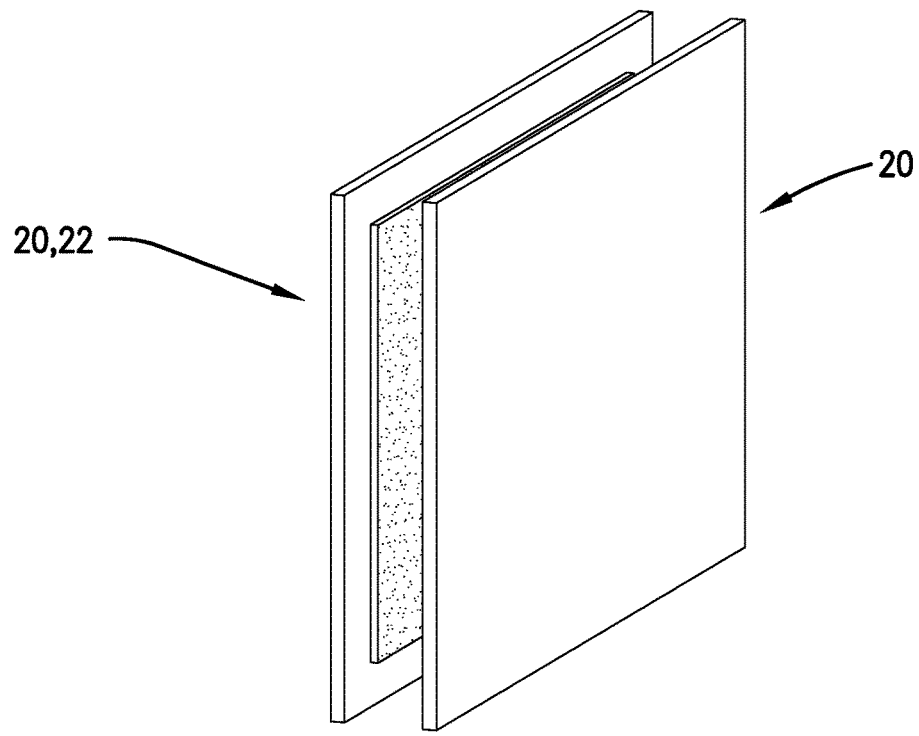
FIG. 5 is a perspective view of the embodiment of the neutron detection element and one plate electrode of FIG. 4 in combination with an additional plate electrode.

In alternative embodiments, the neutron detection element 20 may be integrated with one of the plate electrodes 22, as shown in FIG. 4. In such embodiments, the neutron responsive material may be spin coated to form a continuous layer on one of the surfaces of one of the plate electrodes 22. Typically, the neutron responsive coating is present on a surface of one plate electrode 22 that faces another plate electrode 22, such as shown in FIG. 5.

Figure 6:
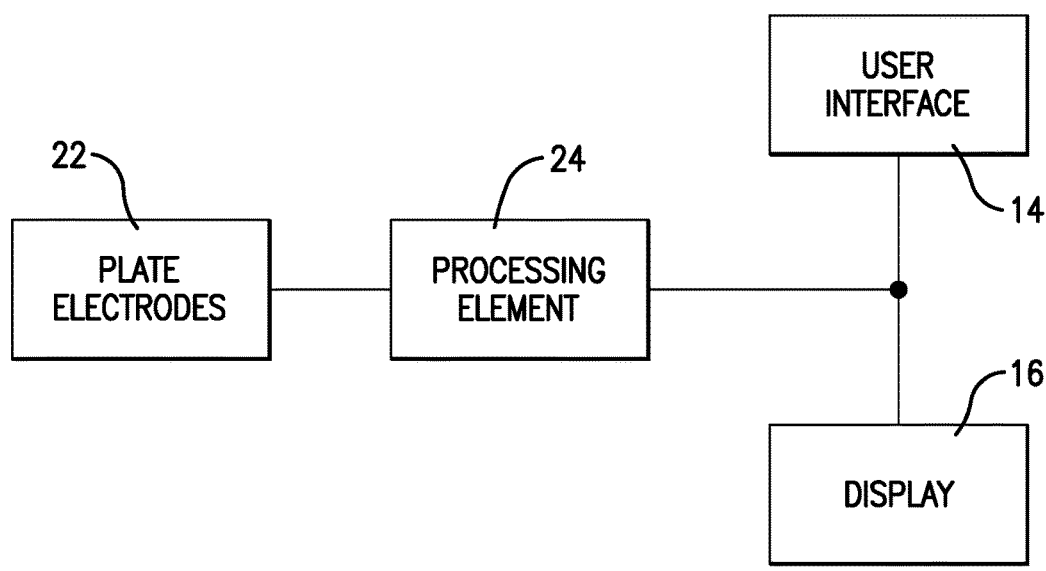
FIG. 6 is a schematic block diagram of at least a portion of the electronic components of the device of FIG. 1.

The processing element 24 generally processes the output of the plate electrodes 22 and communicates information regarding the emission of neutrons to the display 16 and other outputs, as appropriate. The processing element 24 may include filtering and amplifying electronic circuits, such as current amplifiers or current to voltage amplifiers, which receive the output signal from the plate electrodes 22. In some embodiments, the processing element 24 may be the voltage source for the plate electrodes 22. In other embodiments, the voltage source for the plate electrodes 22 may be a separate electric power supply. In various embodiments, the processing element 24 may further include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 24 may generally execute, process, or run instructions, code, code segments, software, firmware, programs, applications, apps, processes, services, daemons, or the like. The processing element 24 may also include hardware components such as finite-state machines, sequential and combinational logic, and other electronic circuits that can perform the functions necessary for the operation of the current invention. In addition, the processing element 24 may include a memory element with electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element may be embedded in, or packaged in the same package as, the processing element 24. The memory element may include, or may constitute, a "computer-readable medium", and may be utilized to store settings for the operation of the device 10 and data regarding the detection of neutron emission. As indicated in FIG. 6, the processing element 24 may be in communication with the display 16 and the user interface 14 through serial or parallel links that include universal busses, address busses, data busses, control lines, and the like.

The device 10 may have a construction as follows. The plate electrodes 22 may be positioned roughly parallel to one another with a space between each adjacent pair of plate electrodes 22, such that the plate electrodes 22 form an array. One neutron detection element 20 may be positioned in the space between each adjacent pair of plate electrodes 22 such that there is a small gap between a first plate electrode 22 and the neutron detection element 20 and a small gap between the neutron detection element 20 and a second plate electrode 22, as can be seen in FIGS. 2 and 3. In alternative embodiments, the neutron detection element 20 may be integrated with the first plate electrode 22 on a surface that faces the second plate electrode 22, as seen in FIG. 5.

The device 10 may also include a rack, or other structure, that holds or retains the plate electrodes 22 and the one or more neutron detection elements 20. In some embodiments, the moderator structure 18 may include just first and second side walls, with the first side wall positioned adjacent to a plate electrode 22 at one end of the array and the second side wall positioned adjacent to a plate electrode 22 at the opposite end of the array, as shown in FIG. 3. In such embodiments, the rack, or other structure, may retain the moderator structure 18 as well. In other embodiments, the moderator structure 18 may include top and bottom walls and four side walls (shown in FIG. 2), or a single spherical or oval side wall, that surround the combination of the plate electrodes 22 and the one or more neutron detection elements 20. In such embodiments, the moderator structure 18 may have the same shape as the interior of the housing 12 and may be positioned therein, as discussed above. The housing 12 and the moderator structure 18, if it surrounds the combination of the plate electrodes 22 and the neutron detection element 20, may include slits, holes, or naturally occurring gaps that allow ambient atmospheric gas to flow from the exterior of the housing 12 to the interior such that gas surrounds the plate electrodes 22 and the neutron detection elements 20.

The processing element 24 electronics may be mounted on one or more printed circuit boards which are positioned within the housing 12. The plate electrodes 22 may be electrically connected to the processing element 24 (and to voltage sources, if necessary) through electrical conductors, such as wires and/or cables. The processing element 24 may also be electrically connected to the user interface 14 and the display 16 through wires and/or cables.

The device 10 may operate as follows. Spontaneously emitted neutrons, from a possibly radioactive source in the vicinity of the device 10, may pass through the housing 12. Neutrons that also pass through the moderator structure 18 may be thermalized, or slowed down, before they strike the neutron detection element 20. If the moderator structure 18 does not surround the plate electrodes 22 and the neutron detection element 20 (such as with the embodiment of FIG. 3), then the neutrons that do not pass through the moderator structure 18 may pass through the neutron detection element 20 (and out of the housing 12) without being detected. Neutrons that do pass through the moderator structure 18 and strike the neutron detection element 20 cause a reaction that produces, at the least, alpha particles. The alpha particles may interact with atmospheric gas molecules that are present in between the neutron detection element 20 and the plate electrodes 22. The interaction may ionize the gas, producing positive gas ions and free electrons between the plate electrodes 22. Some of the gas ions and free electrons may pass through the openings (perforations or pores) in the neutron detection element 20. The presence of the gas ions and free electrons may create an electric current flow between the plate electrodes 22 and generate the output signal of the plate electrodes 22.

The processing element 24 may receive the output signal from the plate electrodes 22 and may determine or measure the value or level of the output signal. Since the level of electrical output signal from the plate electrodes 22 may be proportional to the level of neutron flux (rate of flow) to the neutron detection element 20, the determination of the level of the output signal is also a determination of the level of measured neutron flux. In some embodiments, the processing element 24 may continuously communicate an indication of the level of measured neutron flux to the display 16, wherein the indication may include a graph, a meter reading, a numeric readout, or the like of the level of measured neutron flux. In other embodiments, the processing element 24 may continuously compare the level of measured neutron flux to a predetermined, and adjustable, threshold which indicates a potentially harmful level of neutron flux, and, if the level of measured neutron flux is greater than or equal to the threshold, the processing element 24 may communicate a warning message to be shown on the display 16, activate one or more visual indicators, such as LEDs, activate one or more audio indicators, such as sounding an alarm or sending a sound signal to a speaker, or the like. If the level of neutron flux is less than the potentially harmful threshold, then the processing element 24 may take no additional action.

Figure 9:
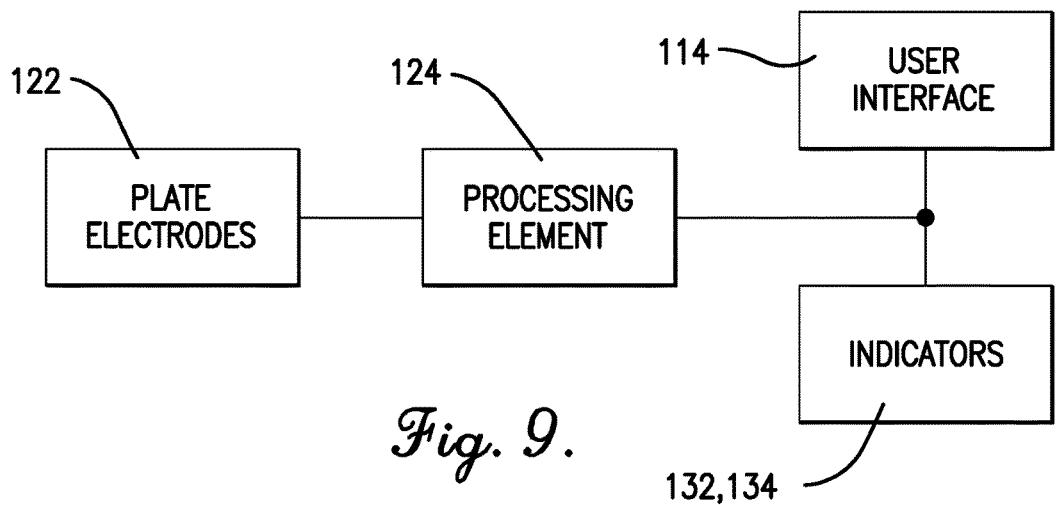
FIG. 9 is a schematic block diagram of at least a portion of the electronic components of the device of FIG. 7.

A second embodiment of the device 100 is shown in FIGS. 7-9. The device 100 may be similar in structure and function to the device 10, but its ability to detect neutron emission may be more directional. The device 100 may broadly comprise a housing 112, a user interface 114, a moderator structure 118, a neutron detection element 120, a plurality of plate electrodes 122, and a processing element 124. The device 100 may further comprise a communication element, such as wireless radio frequency (RF) communication components utilizing RF standards such as cellular 2G, 3G, or 4G, Institute of Electrical and Electronics Engineers (IEEE) 802.11 standard such as WiFi, IEEE 802.16 standard such as WiMAX, Bluetooth™, or combinations thereof, which allows a user to provide input, such as adjusting settings, and allows the device 100 to transmit data regarding the detection of neutron emission.

The housing 112 generally serves the same function as the housing 12, but may have a different shape and structure. The housing 112 may have a generally cylindrical shape with a circumferential side wall 126, a first end wall 128, and a second end wall 130. The first and second end walls 128, 130 may threadably couple to the side wall 126 such that either of the end walls 128, 130 may be unscrewed in order to access the internal components. The housing 112 may further include a first O-ring or gasket positioned the first end wall 128 and the side wall 126, and a second O-ring or gasket positioned between the second end wall 130 and the side wall 126. The O-rings seal the interior of the housing 112 from moisture entry, as well as sealing in back fill gas, such as dry air, between the plate electrodes 122. Like the housing 12, the housing 112 may be constructed from black anodized aluminum or other solid, hardened, emissive metals.

The user interface 114, while similar in function to the user interface 14, may include a first indicator 132 and a second indicator 134, wherein the activation of the first indicator 132 indicates a first condition, such as acceptable levels of neutron emission, and activation of the second indicator 134 indicates a second condition, such as unacceptable levels of neutron emission. Each indicator 132, 134 typically includes an LED, although other lights or visible, or audible, indicators may be utilized. An exemplary first indicator 132 includes a green colored LED, while an exemplary second indicator 134 includes a red colored LED. In some embodiments, the user interface 114 may also include an input, such as a knob or a pushbutton mounted on the housing 112, to allow the user to adjust settings for the operation of the device 100. For example, the user may be able to adjust the sensitivity of the device 100, such as by adjusting a value of a threshold which indicates a potentially harmful level of neutron flux. In other embodiments, the user may be able to interface with the device 100 through the communication element to adjust the sensitivity through software or firmware settings.

The moderator structure 118 generally serves the same function as the moderator structure 18, but may be of solid, cylindrical shape. Like the moderator structure 18, the moderator structure 118 may be constructed from energy absorption materials, such as (high-density) polyethylene, and the like. An exemplary moderator structure 118 may have an axial length of approximately 4 inches.

The neutron detection element 120 may be substantially similar to the neutron detection element 20, and the plate electrodes 122 may be substantially similar to the plate electrodes 22. In addition, the structure of the combination of the neutron detection element 120 and the plate electrodes 122 may be substantially similar to the structure of the combination of the neutron detection element 20 and the plate electrodes 22. Thus, there may be one neutron detection element 120 positioned between each adjacent pair of plate electrodes 122. Furthermore, the neutron detection element 120 and the plate electrodes 122 may each have a general disc shape in order to be positioned within the housing 112. In alternative embodiments, the neutron detection element 120 may be integrated with one of the plate electrodes 122, as discussed above with the neutron detection element 20 and the plate electrodes 22.

The processing element 124 may be substantially similar in structure and function to the processing element 24. The processing element 124 may be in communication with the user interface 114 and the indicators 132, 134, as shown in FIG. 9. In various embodiments, the processing element 124 be mounted on one more printed circuit boards.

The device 100 may have a construction as follows. The plate electrodes 122 may be positioned roughly parallel to one another with a space between each adjacent pair of plate electrodes 122, such that the plate electrodes 122 form an array. One neutron detection element 120 may be positioned in the space between each adjacent pair of plate electrodes 122 such that there is a small gap between a first plate electrode 122 and the neutron detection element 120 and a small gap between the neutron detection element 120 and a second plate electrode 122, as can be seen in FIGS. 7 and 8. Alternatively, one neutron detection element 120 may be integrated with one plate electrode 122 of each adjacent pair of plate electrodes 122.

The neutron detection element 120 and the plate electrodes 122 may be positioned within the housing 112 such that the edges of each component contact the inner surface of the side wall 126 of the housing 112. Thus, the diameter of the neutron detection element 120 and the plate electrodes 122 may be slightly less than the inner diameter of the side wall 126 of the housing 112. Abutting the first end wall 128 of the housing 112 is one end of the moderator structure 118. The combination of the neutron detection element 120 and the plate electrodes 122 may be positioned adjacent to the moderator structure 118. The processing element 124 may be positioned adjacent to the combination of the neutron detection element 120 and the plate electrodes 122, opposite the moderator structure 118. A voltage source, such as batteries, may be positioned adjacent the second end wall 130 of the housing 112. The user interface 114 may be mounted on the second end wall 130.

The device 100 may operate as follows. The device 100 may be held in a user's hand the way a flashlight would be. Typically, the user points the first end wall 128 of the housing 112 in the direction of a suspected neutron emission. Neutrons may strike the first end wall 128 of the housing 112 and pass therethrough, striking the moderator structure 118. Those neutrons whose trajectory is at a nonzero angle with respect to the axis of the moderator structure 118 or do not pass through the entire length of the moderator structure 118 may either miss the neutron detection element 120 or may not have their velocity sufficiently reduced to cause a reaction and thus pass through the neutron detection element 120. Those neutrons whose trajectory is along the axis of the moderator structure 118 and pass through the length of the moderator structure 118 may strike the neutron detection element 120 with sufficiently reduced velocity to cause a reaction that produces, at the least, alpha particles. The alpha particles may interact with atmospheric gas molecules that are present in between the neutron detection element 120 and the plate electrodes 122. The interaction may ionize the gas, producing positive gas ions and free electrons between the plate electrodes 122. Some of the gas ions and free electrons may pass through the openings (perforations or pores) in the neutron detection element 120. The presence of the gas ions and free electrons may create an electric current flow between the plate electrodes 122 and generate the output signal of the plate electrodes 122.

The processing element 124 may receive the output signal from the plate electrodes 122 and may determine or measure the value or level of the output signal. Since the level of electrical output signal from the plate electrodes 122 may be proportional to the level of neutron flux to the neutron detection element 120, the determination of the level of the output signal is also a determination of the level of measured neutron flux. The processing element 124 may continuously compare the level of measured neutron flux to a predetermined, and adjustable, threshold which indicates a potentially harmful level of neutron flux. If the level of neutron flux is less than the potentially harmful threshold, then the processing element 124 may activate the first indicator 132, such as a green LED, indicating safe levels of neutron emission. If the level of neutron flux is greater than or equal to the threshold, then the processing element 124 may activate the second indicator 134, such as a red LED, indicating potentially harmful levels of neutron emission.

Figure 10:
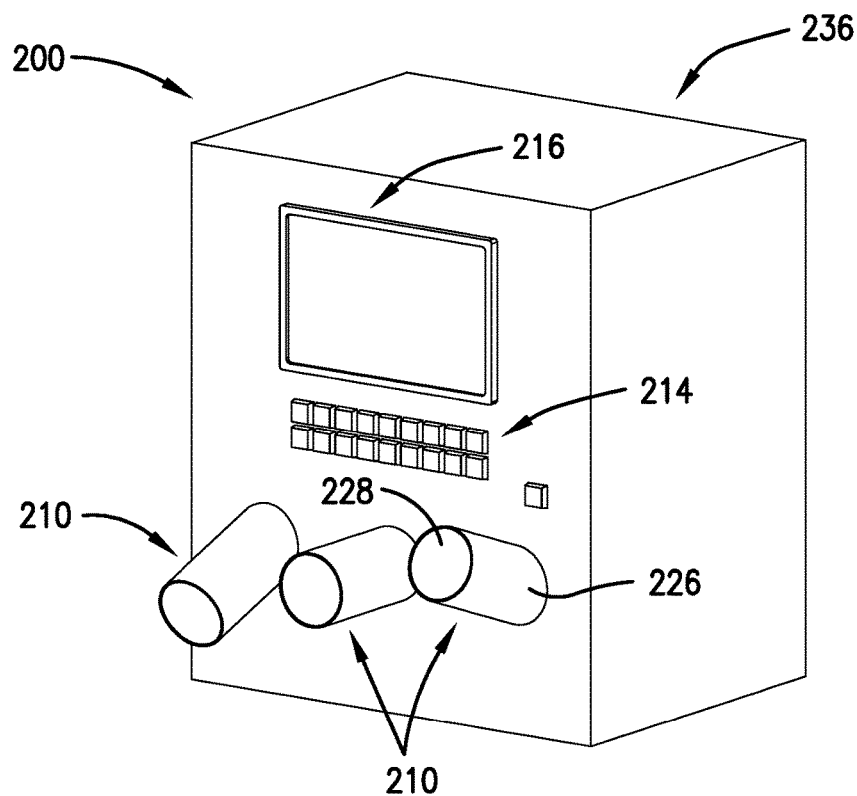
FIG. 10 is a perspective view of a first embodiment of a system for detecting an emission of neutrons, the system including a plurality of neutron detecting devices oriented along a first axis.
Figure 11:
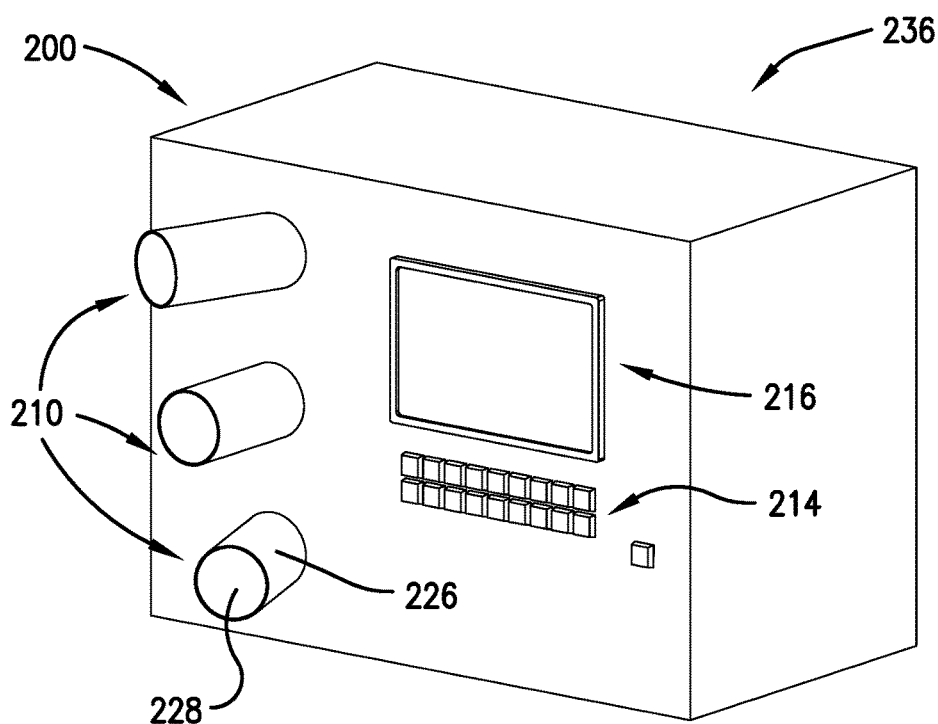
FIG. 11 is a perspective view of a second embodiment of a system for detecting an emission of neutrons, the system including a plurality of neutron detecting devices oriented along a second axis.

The current invention may also provide a system 200 as shown in FIGS. 10 and 11. The system 200 may broadly comprise an array of neutron detecting devices 210 packaged in a single housing 236, wherein each device 210 is directional and may be oriented, or pointed, in a different direction in order to detect neutron emission from multiple sources or from one or more sources that are in motion. The system 200 may additionally comprise a user interface 214, a display 216, and a processing element 238.

The housing 236 generally retains the neutron detecting devices 210 and provides an enclosure for the processing element 238. The housing 236 may be of nearly any shape, although a rectangular box shape with a top wall, a bottom wall, and four side walls may be exemplary. The housing 236 may be constructed from materials that provide strength and durability, such as plastics or metals.

Each neutron detecting device 210 may be similar in structure to the device 100 and may include a device housing 212, a moderator structure 218, a neutron detection element 220, a plurality of plate electrodes 222, and a processing element 224.

The device housing 212 may be similar in structure to the housing 112 with a circumferential side wall 226, a first end wall 228, and a second end wall (not seen in the figures), wherein the first and second end walls 228 are coupled to opposing ends of the side wall 226. However, the second end wall may include threading to be coupled to a side wall of the system housing 236. In certain embodiments, the second end wall may include a ball joint, or similar structure, to be rotatably coupled to the side wall of the system housing 236.

In other embodiments, the second end wall may be integrated with one of the side walls of the system housing 236. The device housing 212 may be constructed from the same materials as the housing 112.

The moderator structure 218, the neutron detection element 220, and the plate electrodes 222 may each be substantially similar in structure and function to the moderator structure 118, the neutron detection element 120, and the plate electrodes 122, respectively.

Each neutron detecting device 210 may have a similar construction to the device 100 except that the second end wall 228 of the device 210 may be adapted, with external threads or a ball joint, to couple with the side wall of the system housing 236. In addition, each device 210 may exclude the first and second indicators 132, 134 of the device 100.

The user interface 214, the display 216, and the processing element 238 may each be substantially similar in structure and function to the user interface 14, the display 16, and the processing element 24, respectively.

Figure 12:
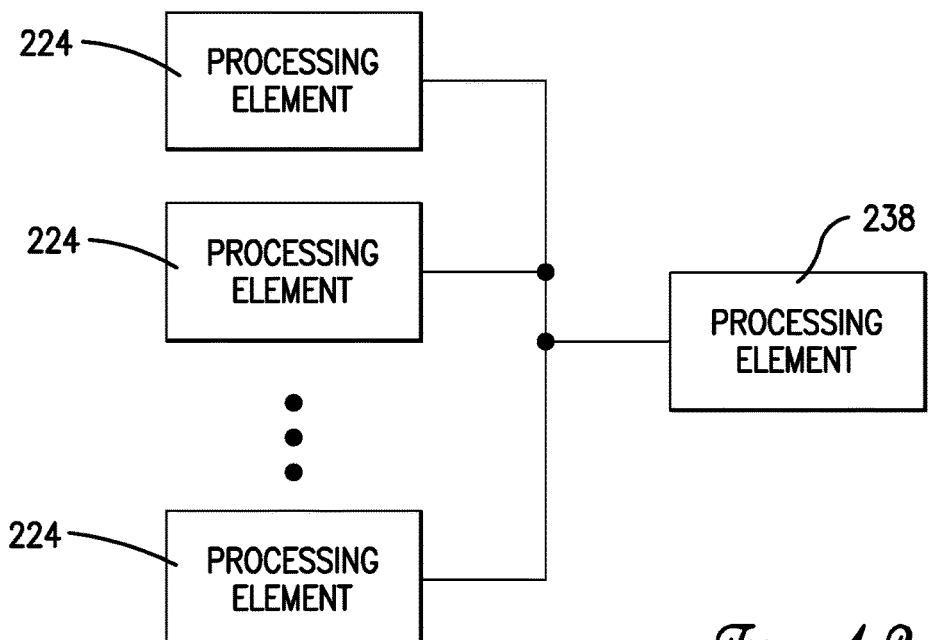
FIG. 12 is a schematic block diagram of at least a portion of the electronic components of the system of FIG. 10 or FIG. 11.

The system 200 may have a construction as follows. Each neutron detecting device 210 may be coupled to one side wall (or more) of the system housing 236. In some embodiments, the side wall of the system housing 236 may have a plurality of threaded sockets, each socket configured to receive the threaded second end wall of one neutron detecting device 210, such that each device 210 is oriented, or pointed, in a unique direction. In other embodiments, the side wall of the system housing 236 may have a plurality of sockets, each socket configured to receive the ball joint second end wall of one neutron detecting device 210, such that each device 210 may be rotatably adjusted in a desired direction. The array of neutron detecting devices 210 may be aligned along a horizontal axis, as shown in FIG. 10, a vertical axis, as shown in FIG. 11, or combinations thereof. The array of neutron detecting devices 210 may additionally or alternatively be positioned on at least one side wall of the housing 236 in the outline of other shapes, such as a circle, a triangle, a square, and so forth. The user interface 214 and the display 216 may be mounted on one of the side walls of the system housing 236. The processing element 224 of each device 210 may be in electronic communication with the processing element 238 of the system 200, as indicated in FIG. 12.

The system 200 may operate as follows. The system 200 may be portable such that a user can carry it around to various locations, or the system 200 may be installed where it can monitor traffic, such as along a roadway where it can monitor vehicles, at a transportation hub, such as a bus station, a train station, an airport, etc., where it can monitor both humans and vehicles, or the like. Neutrons may be spontaneously emitted from one or more sources, either stationary or moving. The neutrons may be detected by one or more of the neutron detecting devices 210 in a manner as described above with the device 100. The processing element 224 of each device 210 detecting neutron emission may transmit a signal to the processing element 238 of the system 200. The signal may indicate a level of measured neutron flux that has been detected. In some embodiments, the processing element 238 may continuously communicate an indication of the level of measured neutron flux to the system display 216, wherein the indication may include a graph, a meter reading, a numeric readout, or the like of the level of measured neutron flux. The processing element 238 may also communicate an indication of the direction of the neutron emission, such as a vector from the system 200 to the source of the emission, to the display 216. In other embodiments, the processing element 238 may continuously compare the level of measured neutron flux to a predetermined, and adjustable, threshold which indicates a potentially harmful level of neutron flux, and, if the level of measured neutron flux is greater than or equal to the threshold, the processing element 238 may communicate a warning message to be shown on the display 216, activate one or more visual indicators, such as LEDs, activate one or more audio indicators, such as sounding an alarm or sending a sound signal to a speaker, or the like. If the level of neutron flux is less than the potentially harmful threshold, then the processing element 238 may take no additional action.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A device for detecting neutron emission, the device comprising:
   a housing providing an enclosure and shielding from radiation other than neutron emission;
   a moderator structure positioned within the housing and formed at least partially from energy absorbing material, the moderator structure including a first side wall and a second side wall spaced apart and oriented roughly parallel to one another;
   a neutron detection element including a roughly planar substrate with a plurality of openings extending between opposing surfaces thereof and a neutron reactive material deposited on the surfaces of the substrate, the neutron detection element receiving no electric voltage or current; and
   a plurality of plate electrodes formed at least partially from electrically conductive material and spaced apart from one another, each adjacent pair of plate electrodes capable of sustaining a voltage therebetween, wherein one neutron detection element is positioned between adjacent pairs of plate electrodes and the combination of plate electrodes and neutron detection elements is positioned between the first side wall and the second side wall of the moderator structure.

2. The device of claim 1, wherein the first side wall and the second side wall are each formed from high-density polyethylene.

3. The device of claim 2, wherein the first side wall and the second side wall each have a wall thickness of approximately 4 inches.

4. The device of claim 1, wherein the housing is formed from anodized aluminum.

5. The device of claim 1, wherein the neutron reactive material is boron 10.

6. The device of claim 1, wherein the neutron detection element emits alpha particles when struck by spontaneously emitted neutrons that have passed through the moderator structure.

7. The device of claim 6, wherein the alpha particles ionize atmospheric gas present in the vicinity of the combination of plate electrodes and neutron detection elements such that the ionized gas results in an electric current flow between the plate electrodes, and a level of the electric current is proportional to a level of flux of the neutron emission to the neutron detection element.

8. A device for detecting neutron emission, the device comprising:

a housing providing an enclosure and shielding from radiation other than neutron emission, the housing having a cylindrical shape and including a circumferential side wall with a first end wall and a spaced-apart second end wall coupled to opposing ends of the side wall;

a moderator structure formed at least partially from energy absorbing material and having a solid, cylindrical shape, the moderator structure positioned within the housing with one end thereof abutting the first end wall;

a neutron detection element including a roughly planar substrate with a plurality of openings extending between opposing surfaces thereof and a neutron reactive material deposited on the surfaces of the substrate, the neutron detection element receiving no electric voltage or current; and a plurality of plate electrodes formed at least partially from electrically conductive material and spaced apart from one another, each adjacent pair of plate electrodes capable of sustaining a voltage therebetween, wherein one neutron detection element is positioned between adjacent pairs of plate electrodes and the combination of plate electrodes and neutron detection elements is positioned adjacent an opposing end of the moderator structure.

9. The device of claim 8, wherein the moderator structure is formed from high-density polyethylene.

10. The device of claim 9, wherein the axial length of the moderator structure is approximately 4 inches.

11. The device of claim 8, wherein the housing is formed from anodized aluminum.

12. The device of claim 8, wherein the neutron reactive material is boron 10.

13. The device of claim 8, further comprising a first indicator indicating a safe level of neutron emission and a second indicator indicating a potentially harmful level of neutron emission, the first and second indicators being visible from the exterior of the housing.

14. The device of claim 8, wherein the neutron detection element emits alpha particles when struck by spontaneously emitted neutrons that have passed through the moderator structure.

15. The device of claim 14, wherein the alpha particles ionize atmospheric gas present in the vicinity of the combination of plate electrodes and neutron detection elements such that the ionized gas results in an electric current flow between the plate electrodes, and a level of the electric current is proportional to a level of flux of the neutron emission to the neutron detection element.

16. The device of claim 1, wherein the substrate is formed from piezoelectric material.

17. The device of claim 1, wherein the substrate is formed from silicon.

18. The device of claim 1, wherein the substrate is formed from glass.

19. The device of claim 1, wherein the substrate is formed from quartz.

20. A system for detecting neutron emission, the system comprising:

a system housing providing an enclosure and shielding from radiation other than neutron emission, the system housing including a plurality of side walls; and a plurality of neutron detecting devices, each neutron detecting device including:

a device housing providing an enclosure and shielding from radiation other than neutron emission, the housing having a cylindrical shape and including a circumferential side wall with a first end wall and a spaced-apart second end wall coupled to opposing ends of the side wall, a moderator structure formed at least partially from energy absorbing material and having a solid, cylindrical shape, the moderator structure positioned within the device housing with one end thereof abutting the first end wall, a neutron detection element including a roughly planar substrate with a plurality of openings extending between opposing surfaces thereof and a neutron reactive material deposited on the surfaces of the substrate, the neutron detection element receiving no electric voltage or current, and a plurality of plate electrodes formed at least partially from electrically conductive material and spaced apart from one another, each adjacent pair of plate electrodes capable of sustaining a voltage therebetween, wherein one neutron detection element is positioned between adjacent pairs of plate electrodes and the combination of plate electrodes and neutron detection elements is positioned adjacent an opposing end of the moderator structure, wherein each neutron detecting device is coupled to a side wall of the system housing and is oriented in a unique direction.

21. The device of claim 20, wherein each moderator structure is formed from high-density polyethylene with an axial length of approximately 4 inches.

22. The device of claim 20, wherein the system housing and each device housing is formed from anodized aluminum, and the neutron reactive material is boron 10.

23. The device of claim 20, wherein the neutron detection element of each neutron detecting device emits alpha particles when struck by spontaneously emitted neutrons that have passed through the moderator structure of each neutron detecting device.

24. The device of claim 23, wherein the alpha particles ionize atmospheric gas present in the vicinity of the combination of plate electrodes and neutron detection elements of each neutron detecting device such that the ionized gas results in an electric current flow between the plate electrodes, and a level of the electric current is proportional to a level of flux of the neutron emission to the neutron detection element of each neutron detecting device.

* * * * *

UNITED STATES PATENT AND TRADEMARK OFFICE
CERTIFICATE OF CORRECTION

PATENT NO.        : 9,910,170 B1
APPLICATION NO.   : 15/182731
DATED             : March 6, 2018
INVENTOR(S)       : Gregory Billiard and George Bohnert Page 1 of 1

It is certified that error appears in the above-identified patent and that said Letters Patent is hereby corrected as shown below:

In the Specification

Please insert the following paragraph at Column 1, Line 4:
-- STATEMENT REGARDING FEDERALLY-SPONSORED RESEARCH OR DEVELOPMENT
This invention was made with government support under Contract No.: DE-NA0000622 awarded by the Department of Energy. The government has certain rights in the invention. --

Signed and Sealed this
Tenth Day of September, 2019

Andrei Iancu
*Director of the United States Patent and Trademark Office*